United States Patent Office 3,395,154
Patented July 30, 1968

3,395,154
2,6 - BIS(2 - ETHYLHEXYL)HEXAHYDRO - 7-
METHYL - 1H - IMIDAZO[1,5-c]IMIDAZOLE
AND PROCESS FOR ITS PRODUCTION
Freeman H. McMillan, Randolph Township, Dover, N.J., assignor to Warner-Lambert Pharmaceutical Company, Morris Plains, N.J., a corporation of Delaware
No Drawing. Continuation-in-part of application Ser. No. 391,025, Aug. 20, 1964. This application Sept. 27, 1967, Ser. No. 671,147
4 Claims. (Cl. 260—309.7)

ABSTRACT OF THE DISCLOSURE

A process for the production of 2,6-bis (2-ethylhexyl) hexahydro-7α-methyl-1H-imidazo[1,5-c] imidazole, by reacting 5-amino-1,3-bis[2-ethylhexyl] hexahydro-5-methylpyrimidine with formaldehyde. The compound so formed is useful as an anti-microbial agent.

This application is a continuation-in-part of my co-pending application Ser. No. 391,025, filed Aug. 20, 1964, now U.S. Patent 3,357,886.

This invention relates to a novel compound of the formula:

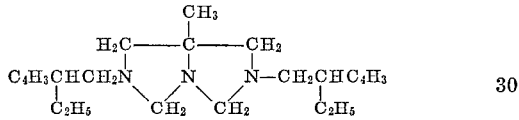

This also relates to a novel method for the production of this compound.

The above compound is useful as an anti-microbial agent, for example, in the inhibition of growth of *Staphylococcus aureus* and is to be used according to the disclosure set forth in U.S. patent application Ser. No. 391,025, filed Aug. 20, 1964, now U.S. Patent 3,357,886.

According to the novel process of this invention, the above compound is prepared by treating at about equimolar ratio 5-amino - 1,3-bis[2-ethylhexyl]hexahydro-5-methylpyrimidine of the formula:

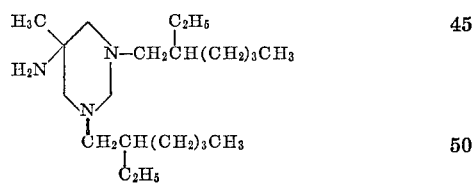

which is available commercially as hexetidine, with an aqueous solution of formaldehyde. Conveniently, the aqueous formaldehyde of commerce containing about 37% formaldehyde can be employed. The reaction may be effected at reflux temperature with or without the use of a solvent. If solvents are employed, lower alkanols such as methanol, for example, are preferred. The desired final product is recovered from the reaction mixture by distillation under a vacuum.

The following example is included in order further to illustrate the process of this invention.

Example

In a round bottom flask is placed 6.8 grams (0.02 mol) of hexetidine, 25 ml. of methanol and 1.62 grams (0.02 mol) of 37% aqueous formalin solution. The mixture is heated under reflux for 4 hours after which the solvent is removed under vacuum. The residue is distilled at oil pump vacuum to give 4.5 grams of 2,6-bis(2-ethylhexyl) hexahydro-7α-methyl - 1H-imidazo[1,5-c]imidazole, boiling at 125°/0.02 mm.

It is understood that the foregoing detailed description is given merely by way of illustration and that many variations may be made therein without departing from the spirit of my invention.

Having described my invention, what I desire to secure by Letters Patent is:

1. Process for the production of a compound of the formula:

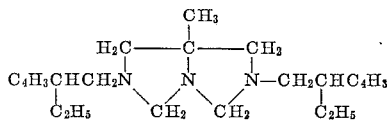

which comprises contacting a compound of the formula:

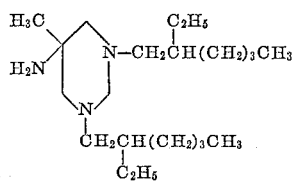

with formaldehyde.

2. Process for the production of a compound of the formula:

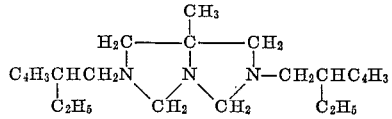

which comprises contacting a compound of the formula:

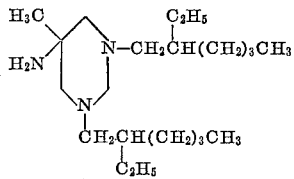

with a solution containing 37% formaldehyde.

3. Process according to claim 2 wherein the reactants are employed at approximately equimolar ratio.

4. 2,6-bis(2-ethylhexyl)hexahydro - 7α - methyl-1H-imidazo [1,5-c]imidazole.

References Cited

UNITED STATES PATENTS 2,393,826    1/1946    Senkus _____ 260—309.7
2,436,779    2/1948    Senkus _____ 260—583

JOHN D. RANDOLPH, *Primary Examiner.*

N. TROUSOF, *Assistant Examiner.*